United States Patent [19]

England

[11] Patent Number: 5,628,386
[45] Date of Patent: May 13, 1997

[54] WHEEL RESTRAINER FOR SHOPPING CARTS

[76] Inventor: Robert W. England, Rt. 1, Box 6-C, Ravenna, Tex. 75476

[21] Appl. No.: 650,239

[22] Filed: May 20, 1996

[51] Int. Cl.⁶ .................................................. B60B 33/00
[52] U.S. Cl. .............................. 188/1.12; 16/35 R; 188/29
[58] Field of Search ........................... 188/1.12, 19, 29, 188/83, 249, 250 H, 5; 267/158, 160, 164; 16/35 R; 280/47.11, 47.15, 33.994, 47.2, 47.22

[56] References Cited

U.S. PATENT DOCUMENTS

| | | | |
|---|---|---|---|
| 2,494,696 | 1/1950 | Forbes | 16/35 R |
| 3,298,467 | 1/1967 | Darnell | 188/1.12 |
| 4,035,864 | 7/1977 | Schroder | 16/35 R |
| 4,114,232 | 9/1978 | Umeda | 188/1.12 |
| 4,828,057 | 5/1989 | Borchard | 267/163 |
| 4,835,815 | 6/1989 | Mellwig et al. | 188/1.12 |
| 5,236,066 | 8/1993 | O'Neal et al. | 188/1.12 |
| 5,390,393 | 2/1995 | Reppert et al. | 16/35 R |

FOREIGN PATENT DOCUMENTS

| | | | |
|---|---|---|---|
| 97859 | 4/1964 | Denmark | 188/29 |
| 1231381 | 5/1971 | United Kingdom | 188/1.12 |

*Primary Examiner*—Robert Oberleitner
*Assistant Examiner*—Chris Schwartz
*Attorney, Agent, or Firm*—Jerry C. Ray

[57] ABSTRACT

A restrainer for shopping cart wheels is a strip of stainless steel or other resilient metal, bent into a generally C-shaped curve. The restrainer is compressed and inserted into the space between a shopping cart wheel and its frame; a shoulder and a tab on a straight end of the restrainer engage the wheel frame to hold the strip in place. A curved end of the restrainer bears against the wheel with sufficient force that resulting friction will prevent the cart from rolling freely down an incline of less than about 15°, while allowing the cart to be pushed by shoppers in the usual way. Corrugations in the curved midsection of the strip add stiffness to increase the amount of friction applied to the wheel.

7 Claims, 3 Drawing Sheets

( VIEW I-I )

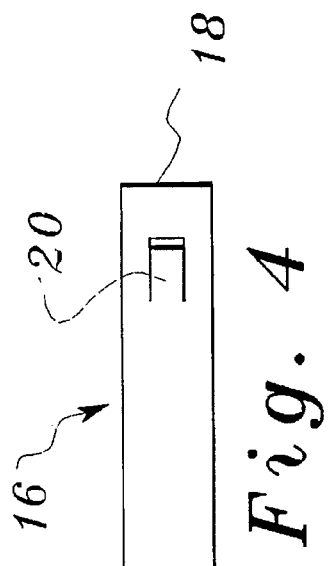
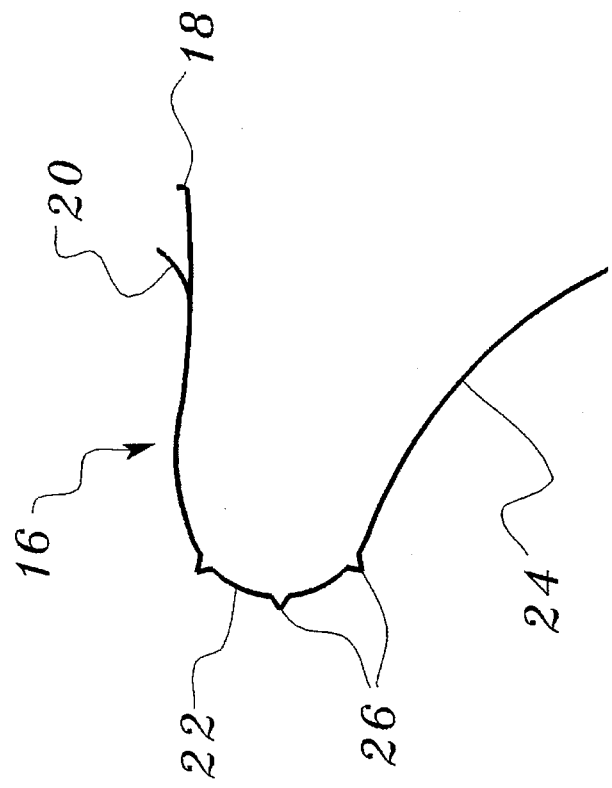
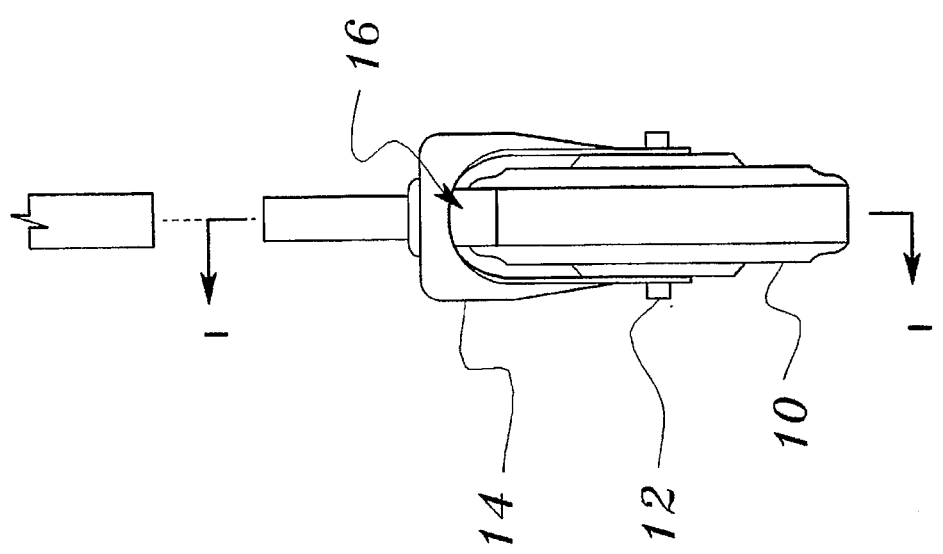

WHEEL RESTRAINER FOR SHOPPING CARTS

CROSS REFERENCE TO RELATED APPLICATIONS

None.

BACKGROUND OF THE INVENTION

1. Field of the Invention

This invention relates to devices for restraining the rotation of wheels, and especially to such devices for restraining the rotation of wheels on shopping carts to prevent the carts from freely rolling down inclines.

2. Description of the Related Art

Most visitors to grocery stores and shopping centers have witnessed a shopping cart rolling down an incline in a parking lot. These runaway carts are likely to ram parked or moving cars, causing property damage which results in clams against owners of the carts.

Several attempts have been made to provide some mechanism which will prevent carts from rolling down a gentle incline such as may be found in a paring lot. Of course, any such device must also allow the cart to be used in its normal manner. High cost, maintenance, and difficulty of use have limited the success of efforts to solve this problem.

Much of the prior art discloses user-operated bring devices which require activation by a user, either to engage the brake to prevent the cart from rolling or to disengage the brake so the car can be moved. An example is seen in Rutter et al., U.S. Pat. No. 5,328,000. Other devices continuously apply friction to one or more wheels; this latter type of device generally has means for adjusting the amount of applied friction, increasing the complexity and number of parts required. An example of the latter type is Hicks, U.S. Pat. No. 5,275,472.

SUMMARY OF THE INVENTION

The present invention provides a simple, one-part device for restraining the rotation of a grocery-cart wheel. The device may be quickly installed, and requires no tools for installation. Made of stainless steel, the wheel restrainer will require no further maintenance, and will withstand high-temperature solutions commonly used to clean grocery carts.

An elongate strip of stainless steel is bent into a generally "C"-shaped curve. One end of the strip is straight; this end fits against and engages the frame which is supported by the wheel. A shoulder engages the frame to prevent the restrainer from moving in one direction, and a raised tab bears against part of the frame to prevent movement in another direction. The other end of the strip is curved to conform to the diameter of the wheel to which the restrainer is fitted. This curved end bears against the wheel, providing the friction that makes the wheel rotate less freely. The amount of friction is such that the cart can be pushed easily for shopping, but will not roll away down a slight incline.

An added benefit of the wheel restrainer is that the outer surface of the wheel is kept free of foreign objects stuck to the wheel. This is accomplished by an end of the wheel restrainer which bears against the wheel and scrapes off any particles stuck to the wheel, resulting in a smoother ride.

Accordingly, it is an object of this invention to provide a device for restraining the rotation of shopping cart wheels.

It is a further object to provide a device which will prevent damage to shopping carts, persons, and automobiles from shopping carts from rolling uncontrolled down inclines.

It is a further object to provide such a device which is simple, durable, reliable, and low-cost, which may be installed quickly and easily with no tools, and which requires no additional maintenance.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 3 is a front elevation showing the restrainer in place on a wheel assembly.

FIG. 4 is a top plan view of the wheel restrainer showing a locking tab.

FIG. 5 is a side elevation of the restrainer with corrugations, in a non-installed, relaxed configuration.

CATALOG OF THE ELEMENTS

Figure 1:
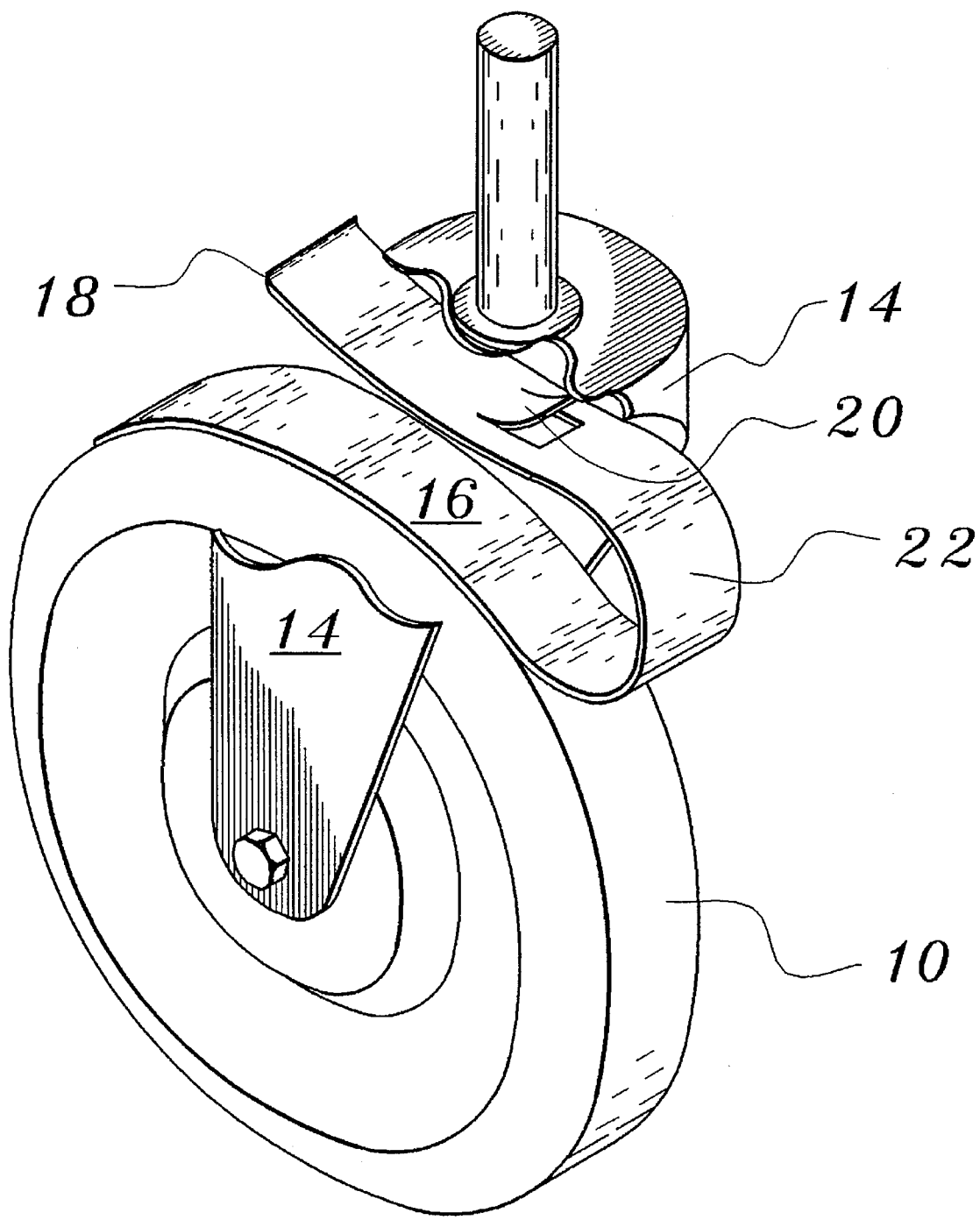
FIG. 1 is a front fight perspective of the wheel restrainer in place on a shopping cart wheel, with part of the wheel frame cut away.

To aid in the correlation of the elements of the invention to the exemplary drawings, the following catalog of the elements is provided:

10 wheel
12 axle
14 frame
16 wheel restrainer (or "strip")
18 shoulder
20 tab
22 curved midsection
24 wheel contact surface
26 corrugation

DESCRIPTION OF THE PREFERRED EMBODIMENTS

Referring to the drawings, FIG. 1 illustrates a restrainer 16 for grocery cart wheels; the restrainer is shown installed between the wheel frame 14 and the wheel 10. Wheel frame 14 is supported by axle 12 of wheel 10. FIG. 5 shows only the wheel restrainer in its relaxed, i.e., not compressed, condition. The restrainer 16 is made of a strip of resilient metal, preferably stainless steel, and a restrainer is sometimes referred to herein as a "strip." Stainless steel is preferred because of its toughness and resistance to corrosion.

A curve in the midsection 22 of the strip gives springiness to the piece; the curve imparts a general C-shape to the metal strip, as shown in FIG. 4. When the first and second ends of the metal strip are pushed together, the ends must be compressed against the resilience or springiness of the metal.

As shown in FIG. 5, one embodiment provides one or more corrugations 26 in the curved midsection 22 of the metal strip. The corrugations are shown protruding toward the convex side of the curve, but may also protrude toward the concave side of the curve. Because each side of a corrugation 26 is straight, the continuity of the midsection curve is interrupted, i.e., there is no longer a smooth continuous curve through the midsection of the strip. The result is that the strip becomes stiffer, requiring more force to compress it with a correspondingly greater force being exerted against the wheel 10 of the shopping cart as described below.

Referring to FIG. 1 and FIG. 5, the first end of the strip is the straighter end. A shoulder 18 and a tab 20 on the first end each engage the frame 14 of the wheel assembly to hold the restrainer 16 in place, as explained below. To install the wheel restrainer in a standard grocery cart wheel, the restrainer is held in a compressed position as the two ends are inserted between the upper surface of the wheel 10 and the wheel frame 14. Fingers easily exert enough pressure to compress the strip, so that no tools are needed for installation. If desired, the restrainer may be bound in its compressed mode with a length of cord or any suitable binding material. Then, after insertion, the binding is cut or removed to allow the strip to relax toward its opened configuration. FIG. 3 illustrates the wheel assembly from the front, showing the restrainer 16 in place; only a small portion of the restrainer strip is visible.

Figure 2:
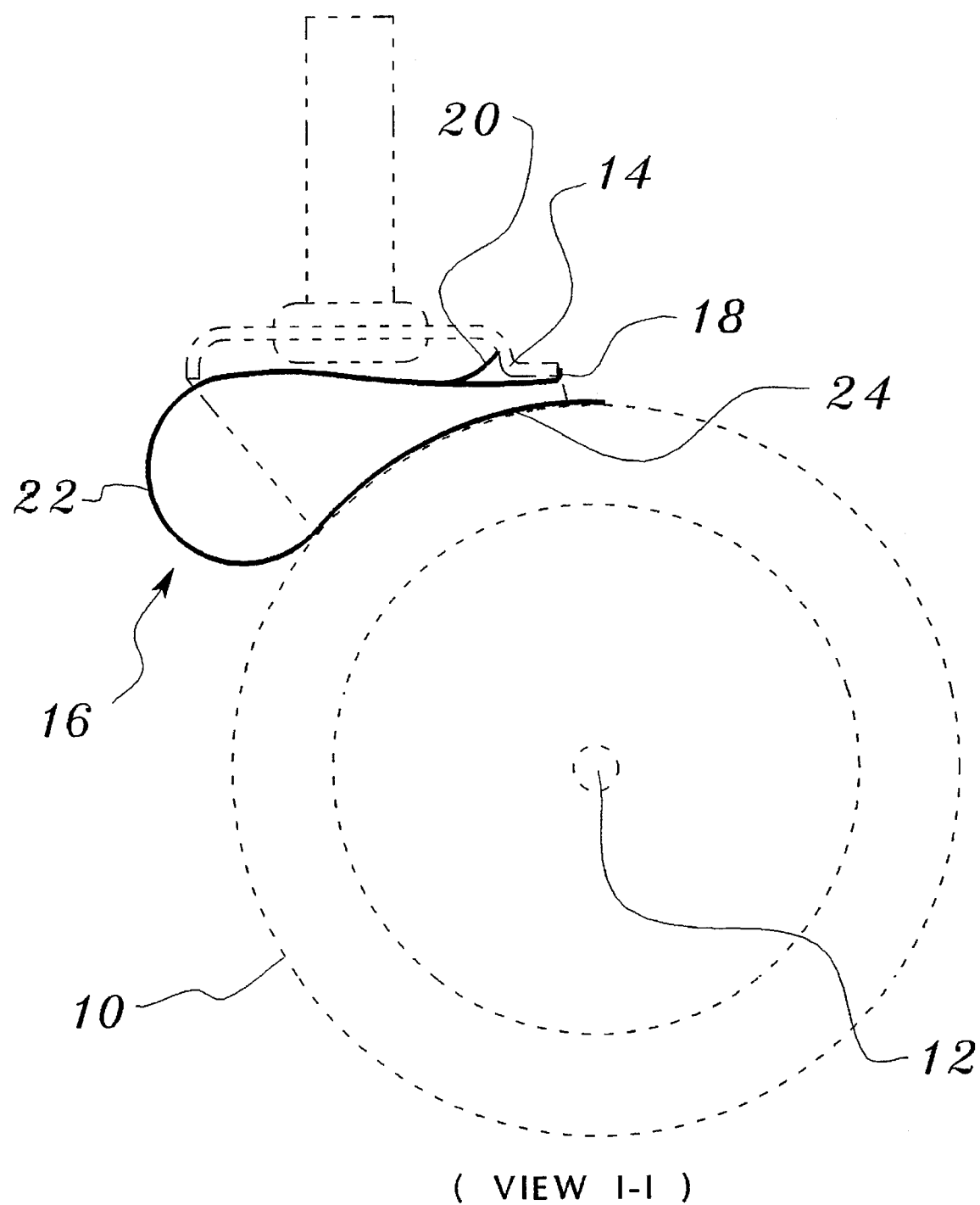
FIG. 2 is a cross section along view I—I of FIG. 3, showing the restrainer in place on a shopping cart wheel assembly.

After being inserted between wheel and frame, the compression is relaxed and the metal strip is allowed to move toward its opened, pre-insertion shape. The shoulder 18 on the first end of the metal strip engages the frame 14 of the wheel when pushed sufficiently far in, as shown in FIG. 2. Locking the strip in place, shoulder 18 prevents rotation of wheel 10 from moving restrainer 16 back in the direction from which it was inserted, i.e., toward the front of the wheel assembly. In one embodiment, the shoulder cooperates with the wheel contact surface 24, described below, to hold the restrainer in position and prevent its movement in either direction.

In another embodiment, shown in FIG. 2 and FIG. 4, a metal tab 20 extends upward from the central portion of the straight end of the strip. Tab 20 is formed during manufacture of the restrainer by a punch or die which cuts around three sides of the tab, then bends the cut tab so that it protrudes from the upper surface of the strip. The tab is positioned to engage the undersurface of the wheel frame 14, so that it bears against the frame and prevents the restrainer 16 from moving in a forward direction. Thus, shoulder 18 and tab 20 cooperate to lock the restrainer in place. Compression of the curved strip, to disengage the shoulder and tab from the frame, is required before the restrainer can be removed.

As the strip flexes outward, a curved portion of the strip near its second end, designated as wheel contact surface 24, contacts and bears against a curved surface of the wheel 10. The radius of curvature of this curved portion of the strip is the same as that of the wheel's perimeter, maximizing the area of contact between wheel contact surface 24 of the strip and wheel 10. Friction between wheel contact surface 24 and wheel 10 restrains the wheel from rotating freely.

An extremity of the second end of the restrainer strip, that is, the end of the portion of the strip which is in contact with the wheel, bears against the wheel 10, as shown in FIG. 2. As rotation of the wheel moves the wheel perimeter against the end of the strip, foreign matter on the wheel is scraped off and removed from the wheel by the strip's end, resulting in smoother motion of cart.

In its preferred mode of installation, a shopping or grocery cart would have a wheel restrainer 16 installed on each of its two rear wheels. In place on the wheel, the restrainer bears against the wheel's outer surface. Sufficient friction results so that when two wheels have restrainers, a cart will not roll down an incline of less than 15°, and will gradually come to rest even if given a push down such an incline. The cart may, however, be rolled about store aisles in the usual way; the added friction does not hinder one from pushing the cart.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. A combination of a restrainer and a shopping cart frame having a wheel, comprising:

a compressible curved strip of resilient metal having a first end, a second end, and a curved midsection, a straight portion adjacent said first end, said straight portion adjacent said first end having means for locking said restrainer into engagement with a frame supported by an axle of said shopping cart wheel, a curved portion adjacent said second end to resiliently press against a perimeter of said wheel to retard the rotation of said wheel, and said strip of metal being compressed between said frame supported by an axle of said wheel and a surface of said wheel so that said curved portion exerts a force against said surface of said wheel.

2. The invention as described in claim 1, further comprising:

at least one corrugation across a width of said curved portion of said strip of metal to increase the rigidity of said strip of metal.

3. The invention as described in claim 1, wherein said means for locking said restrainer into engagement with said frame and said wheel further comprise:

a shoulder at an extremity of said first end for engaging said frame to prevent rearward movement of said restrainer, said curved portion of said second end engaging said wheel, and said shoulder and said curved portion cooperating to restrain said strip of metal in position.

4. The invention as described in claim 1, wherein said means for locking said restrainer into engagement with said frame and said wheel further comprise:

a shoulder at an extremity of said first end for engaging said frame, a tab extending from said strip adjacent said first end for engaging said frame, and said tab and said shoulder cooperating to engage the frame so that said strip of metal is held in position.

5. The invention as described in claim 1, wherein an extremity of said second end scrapes a perimeter of said wheel to remove foreign matter from said wheel as said wheel rotates.

6. The invention as described in claim 1, wherein said curved portion adjacent said second end has a radius of curvature matching a radius of curvature of said wheel.

7. The invention as described in claim 1, wherein said strip of resilient metal is a strip of stainless steel.

* * * * *